Figure 3:
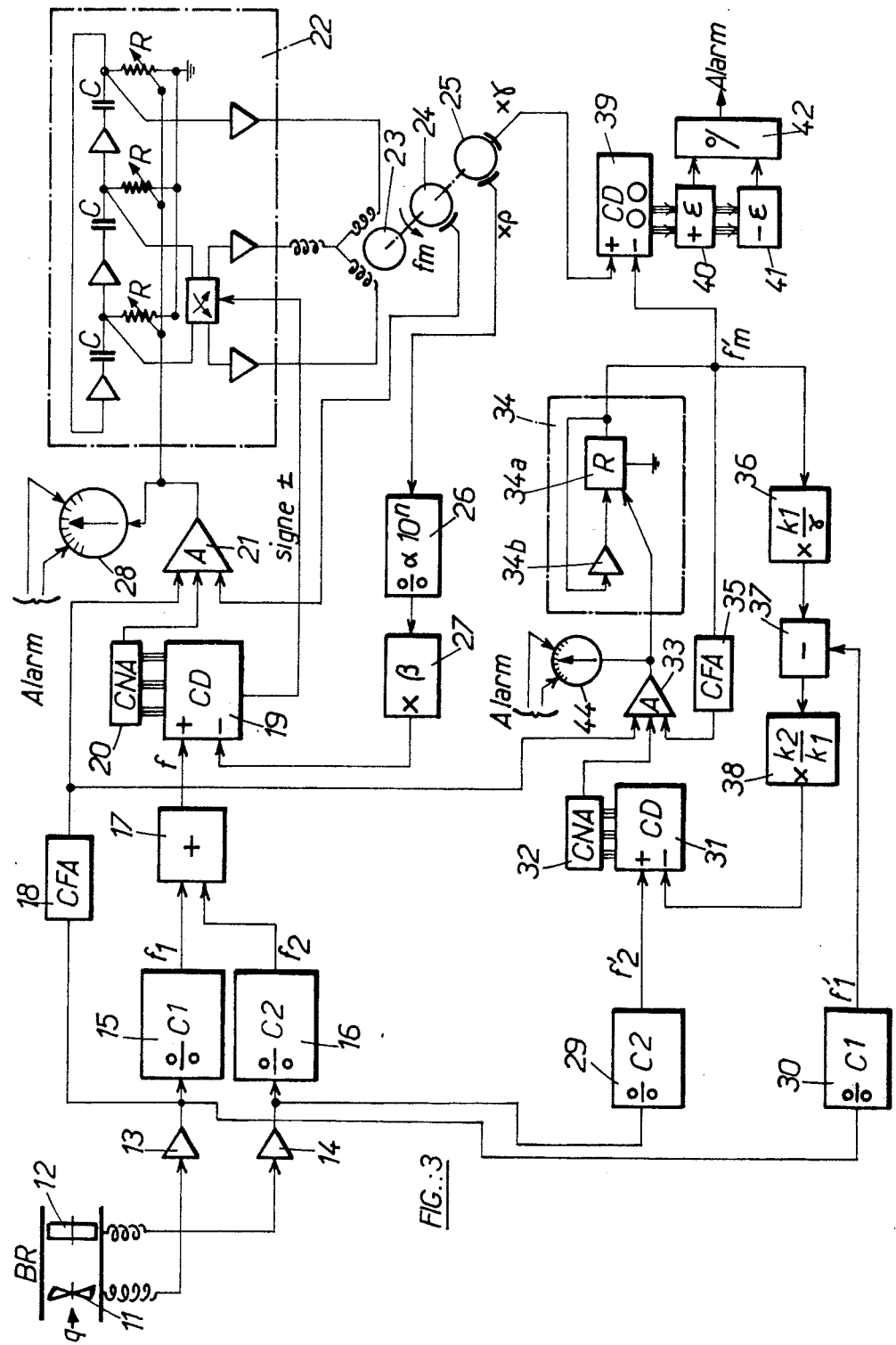

United States Patent [19]

Penet

[11] 4,130,785

[45] Dec. 19, 1978

[54] CONTROL ASSEMBLY FOR A CYCLICALLY OPERATING POWERED UNIT

[76] Inventor: Pierre M. M. Penet, 4 Rue de Bourgogne, Creteil, France, 94

[21] Appl. No.: 762,179

[22] Filed: Jan. 24, 1977

[30] Foreign Application Priority Data

Jan. 26, 1976 [FR] France .................. 76 01996

[51] Int. Cl.² ................................... H02P 5/00
[52] U.S. Cl. ....................... 318/318; 318/327
[58] Field of Search ........... 318/314, 318, 327, 341, 318/335

[56] References Cited

U.S. PATENT DOCUMENTS

| | | | |
|---|---|---|---|
| 3,331,006 | 7/1967 | Strand et al. | 318/318 X |
| 3,553,551 | 1/1971 | Arnold | 318/327 X |
| 3,634,745 | 1/1972 | Agin | 318/327 X |
| 3,753,067 | 8/1973 | Milligan | 318/318 X |
| 3,950,682 | 4/1976 | Dohanich, Jr. | 318/327 X |
| 3,974,428 | 8/1976 | Hafle | 318/318 |

*Primary Examiner*—Gene Z. Rubinson
*Attorney, Agent, or Firm*—William J. Daniel

[57] ABSTRACT

A cyclically operating electrically or hydraulically powered unit, is provided with a control assembly comprising a partially digital control loop formed by a sensor responsive to the powered unit for the production of pulses at a multiple of the frequency thereof, a reversible counter having a count-up input receiving a control signal and a count-down input receiving a signal derived from the sensor and a digital-to-analog converter connected to the reversible counter to detect it state and supply a control signal to the powered unit.

6 Claims, 3 Drawing Figures

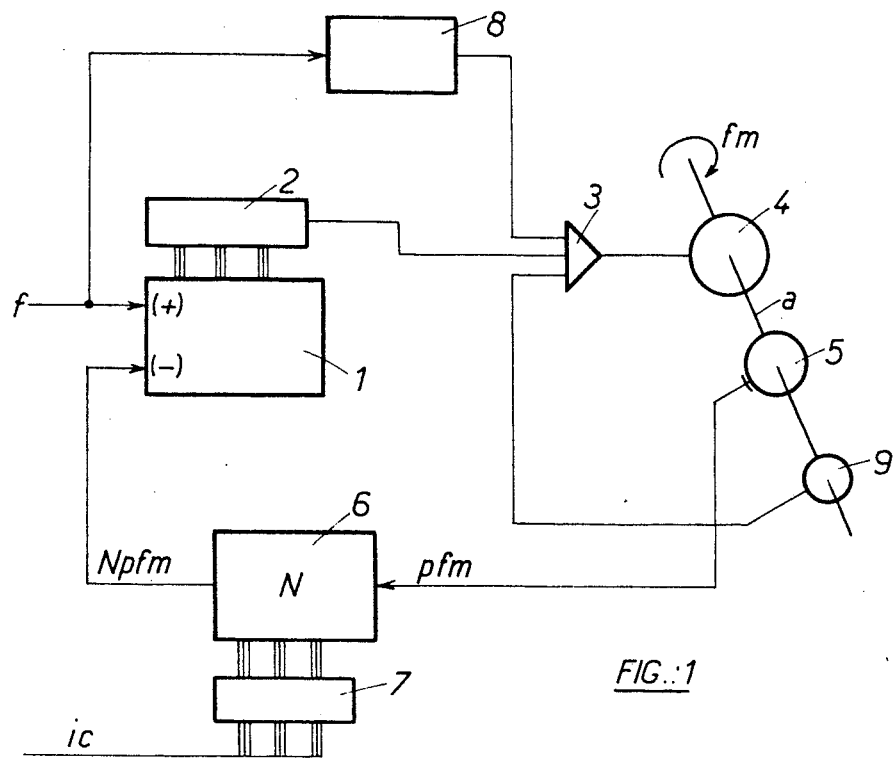
FIG.:1
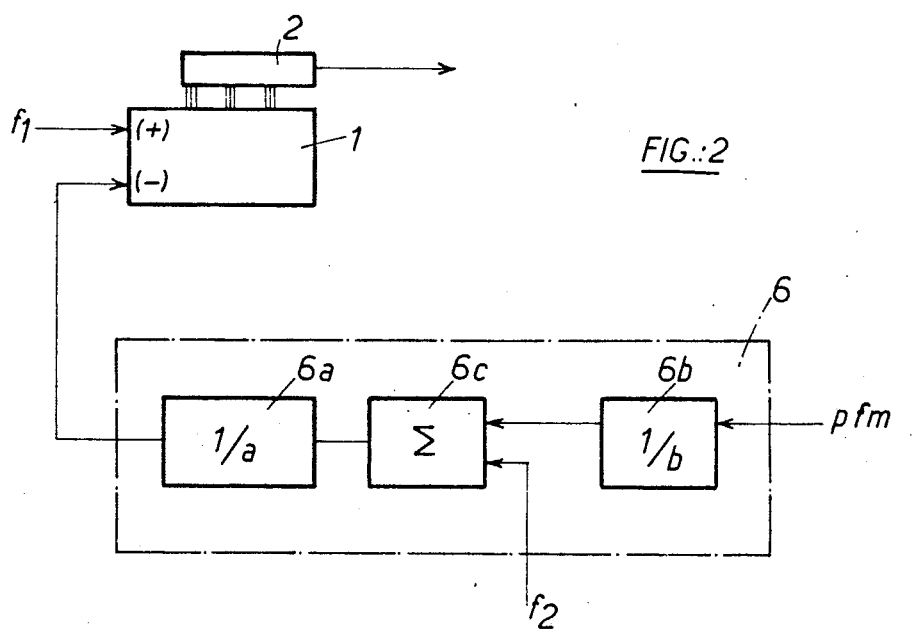
FIG.:2

CONTROL ASSEMBLY FOR A CYCLICALLY OPERATING POWERED UNIT

This invention relates to a control system and more specifically to an at least partially digital control assembly for an electric motor or other cyclically operating electrically or hydraulically powered system. The invention may be applied, for example, to a variable speed control assembly of a mixed digital analog type, serving to control either a DC electric motor, a polyphase AC motor, a hydraulic motor (the electric circuits used in the case of the electric motor being replaced by fluidic circuits as far as necessary), or again an electrical frequency generator. The invention is also concerned with the use of such an assembly in a flow-measuring device of a fluid for which it is particularly adapted.

By way of illustration, the background of the invention will be discussed with reference to a DC motor of which the speed is to be regulated using an assembly according to the invention.

It is known that control systems which are at least partly digital, permit the achievement of very high accuracy in the regulation of the speed of a motor. A known device for this purpose has a locked loop controller somewhat analogous to the locked loop controllers which are used for the synchronization of the frequency in radio. The loop of known phase in question consists of a phase comparator which receives pulses at the control frequency on one of its inputs and the pulse signals supplied by a coder driven by the motor on the other. This loop comprises, in succession, after the phase comparator, a filter, a motor control circuit and the motor itself.

An object of the invention is the completion and improvement of a loop control device of the above type, that is to say, including in particular an input element receiving the control signal, a motor control unit, the motor itself and a coder mounted on the shaft of the motor or equivalent system.

The result is attained by using a reversible counter in place of the above-mentioned phase comparator.

According to the invention, there is provided a control assembly for a cyclically operating electrically or hydraulically powered unit, which consists of a control loop, at least part of which is arranged to handle digital signals, which loop comprises a sensor responsive to the cyclical operation of the powered unit for the production of pulses at a multiple of the operating frequency thereof, a reversible counter having two inputs respectively receiving a control signal and a signal derived from the sensor, one of said inputs being a count-up input and the other a count-down input, and a digital-to-analog converter connected to the reversible counter to detect its state and react in a corresponding manner on the powered unit.

Besides, according to a particularly interesting aspect of the invention, advantage is taken of utilising a control which is partly digital by placing in the numerical part of the loop, an auxiliary programmer which allows the introduction of any desired programme carrying out arithmetical operations, (for example multiplication, division, subtraction, addition), relating to the frequency signals to be handled or auxiliary frequencies thus permitting, as will be seen later, fluid flow measurements of liquids or gases by relating the speed of rotation of the motor to flow rate to directly obtain values representing correct volumes, masses counted, quantities of calories, units of cooling, etc., without mentioning other possible applications.

For such a control assembly, application has been particularly envisaged in the measuring of fluid flow, preferably with the aid of a flow meter turbine of the type described in U.S. Pat. No. 3,735,637.

The invention will be better explained and understood by referring to the following description of an embodiment thereof with reference to the accompanying drawings, in which:

FIG. 1 is a schematic diagram of a variable speed controller according to the invention, FIG. 2 is a schematic diagram of a programmer for use with the controller shown in FIG. 1, and FIG. 3 illustrates the application of the invention to flow metering.

Referring to FIG. 1, a multi-stage reversible counter 1 has a count-up input (+), on which it receives a control signal of frequency f, so that the successive pulses of this control signal applied to the said input are totalised, and a count-down input (−) permitting the subtraction from the stored total of the pulses applied thereto.

The various stages of counter 1 are connected to a digital-to-analog converter 2 which continuously transforms the coded information, corresponding to the state of the counter 1, into a voltage signal proportional to this coded information, with the polarity indicated by its sign.

The electrical voltage thus obtained is applied to one input of a bidirectional amplifier 3, with one or more stages, capable of feeding (through its inductor) a DC electric motor 4.

A sensor comprising a conventional incremental coder 5 is mounted on the shaft a of the motor, the pickup of the coder 5 producing p pulses per revolution of the shaft a.

This means that if $f_m$ is the frequency of rotation of the motor in revolution/second, the frequency of the signal produced by the pickup is $pf_m$. This signal is applied, after transformation, in a manner to be explained hereinafter, to the count-down input (−) of the counter 1, in such a manner that the principal above-mentioned elements 1, 3, 4 and 5, which make up the above-mentioned locked loop controller controls the speed of the motor 4.

According to a preferred feature of the invention, a programmer 6 is inserted into the said loop, this programmer having the role of transforming the signal from the coder pickup (of frequency $pf_m$) before applying it to the terminal (−) of the input element 1.

A memory 7, set from a control information input $i_c$, is connected to this programmer 6. The programmer 6 performs an operation symbolised by N on the sequence of frequency pulses $p \times f_m$. The signal being emitted from the element 6 thus has a frequency $pf_m \times N$ and is applied to the second input of the two-way counter 1.

With a system constructed in this way, it can be seen that:

$$f_m = \frac{m \times g \times f}{1 + m \times g \times p \times N}$$

where:

m = the coefficient of proportionality, relating the speed of the motor to applied voltage, in revolutions/seconds/volts and g = the gain of the amplifier 3.

If m × g × p × N is substantially greater than 1, which is generally the case, there is obtained:

$$f_m = f/(p \times N)$$

which means that the revolutional speed follows the control frequency f in accordance with a coefficient of proportionality.

In the construction of FIG. 1 the supplementary elements can be forecasted to good effect.

Notably, a frequency-to-current converter 8, also supplied with the control frequency f, can supply a direct input signal to the amplifier 3, in order to reduce error due to dynamic lag, but it should be understood that response to transient conditions is ensured by the numerical part (5, 6) of the loop, which permits the integration of the error signal by assuring the systematic correction of the fluctuations. Furthermore, a tachometric generator 9 can be mounted on the shaft of the motor thus producing an analog signal proportional to the speed thereof, which is applied with advantage to an input of the amplifier 3, thus ensuring a better control of speed. These two last-mentioned arrangements (8 and 9 with their associated circuits) are known per se.

It is obvious that no departure is made from the framework of the invention by replacing the combination of the motor 4 and the periodic incremental coder generator 5 by a single electronic generator, of any appropriate type, supplying a frequency of $p \times f_m$.

FIG. 2 shows, by way of example, a possible layout for the programmer 6. This consists of a series assembly of three elements namely a calculator 6c connected between an operator 6a, for example a divider, and another operator 6b. The calculator 6c receives on its other input a control signal, of frequency $f_2$, produced by a convenient supplementary circuit. With this programmer:

$$f_m = (af_1 - f_2) b/p$$

This programmer can be used to effect a temperature correction. For example, if $f_2 = 0$, $b = 1$, $a = p(1 - \alpha \Delta \theta)$ and $f_1 = kq$ (with q = measure of output, k being the factor of proportionality), then:

$$f_m = f_1 (1 - \alpha \Delta \theta) = kq (1 - \alpha \Delta \theta)$$

As another example of the application of the invention, if $f_2 = 0$, $b = p$, $a = \rho$ (density) or $\Delta \theta$ (temperature difference), then respectively:

$f_m = k\rho q$: in the event of mass count or:
$f_m = k \Delta \theta q$: in the event of calorific count.

Finally, if $b = p$, $a = 1$ and the element 6c is an addition or subtracting unit, then:

$$f_m = f_1 \pm f_2.$$

Thus, it is obvious that the programmer unit 6 situated in the loop can ensure very varied operations such as multiplication, division, addition, subtraction and other combinations, and thus is capable of many diverse applications.

The above DC motor can be replaced by a three phase motor, for example, a squirrel cage motor, by making the necessary modifications.

FIG. 3 shows the application of a control assembly as described above to the metering of fluids, using a fluid meter turbine with two rotors such as that described in the above-mentioned U.S. specification, with reference to FIG. 5 thereof.

It will be recalled that according to the above-mentioned specification, the device for measuring the flow rate of a stream of liquid in a conduit comprises in combination:

the said turbine with two rotors, that is a primary rotor made up of a propeller with inclined blades, mounted on an axle arranged longitudinally in the conduit, and a secondary rotor which rotates freely, mounted coaxially with the primary rotor and downstream with respect to it, and having perceptibly radial blades, means for measuring the rotational speed of the two rotors, means for measuring the flow rate which is proportional to a linear combination of these speeds, such as their sum, and means for comparing these two speeds to control the precision of the flow measurement.

For fuller details regarding the construction of such a combination, the said U.S. specification is to be referred to.

In FIG. 3 of the drawings accompanying the present specification, the bi-rotor turbine in question can be seen at BR, the two rotors thereof being represented at 11 and 12. Connected to the turbine BR are two control assemblies constructed in accordance with the present invention and adapted to function with the turbine BR in the manner described in the said U.S. specification, that is to say:

a primary control assembly represented on the upper part of FIG. 3, having the function of setting into rotation the shaft of a motor 23 at a speed proportional to the flow measured by the turbine BR and thus permitting the use of a convenient mechanical counter (not shown) driven by the shaft of the said motor; for example this piece of mechanism can effect, in a known way, the printing of a record strip, and a secondary control assembly shown on the lower part of FIG. 3, which produces a frequency signal (of frequency $f'_m$), which is compared with that of the frequency coder 25 mounted on the shaft of the motor 23, with the object of detecting at any moment whether all the primary assembly with the turbine and the attached units are functioning correctly, as demanded in metering installations for vending where the measurements are used for the invoicing of delivered quantities.

The similarity of the different units of FIG. 3 with those of FIGS. 1 and 2 and with the said U.S. specification will be apparent from the following description.

In the counting sequence, the main propeller 11 and the compensation rotor 12 of the turbine BR produce frequency signals through the intermediary of electronic matching circuits 13 and 14, connected to two pickups situated on the body of the turbine and preferably comprising electrical coils influenced by the passage of the blades of the rotors.

The signals thus produced are respectively applied to dividers 15 and 16 of which the coefficients of division $C_1$ and $C_2$ are equal to the number of the blades of each of the rotors respectively, in order to furnish, at their outputs, frequency signals $f_1$ and $f_2$ equal to the number of revolutions per second of each corresponding rotor.

The signals thus produced are applied to addition circuit 17 with anti-coincidence which delivers a pseudo-frequency signal to the count-up input (+) of a reversible digital counter 19.

In the embodiment illustrated, which is intended for the control of a three phase motor, the sign of the count in the counter 19 is used to govern the commutation of two phases of the motor in order to operate it in the driven or braked state.

The count in of the counter 19 being digital, a digital-to-analog converter 20 is connected to it to produce an analog signal proportional to the absolute value of the difference between the two frequencies which enter the said counter.

This signal is applied to an amplifier 21 which modulates the oscillation frequency of a three phase generator 22, for example, through the intermediary of resistance elements of phase shifting cells of this same generator, each made up of a capacitance C and a resistance R such that:

$$R \times C \times \omega = (1/\sqrt{3}),$$

which defines oscillation frequency of the generator and the rotational speed of the three phase motor as:

$$f_m = 1/(2 \times \pi) \, \omega/m$$

where:
$f_m$ = the speed of the motor in revolutions per second,
m = the number of pairs of poles of the motor,
$\omega$ = the angular frequency of the signal generated by the three-phase oscillator.

On the shaft of the motor 23 there are mounted:
a tachometric generator 24 which improves the functioning of the control,
an incremental coder 25 producing a signal of frequency $p \times f_m$ (p selected as a function of the case in point and as indicated below for the case of a flow meter turbine BR).

This signal $p \times f_m$ is thus applied to the programmer (6 in FIG. 1) which is made up by a divider 26 (by $\alpha 10^n$) followed by a multiplier 27 (by $\beta$).

At the output of the programmer, there is thus produced a signal of which the frequency is:

$$f_r = (p f_m \beta / \alpha 10^n)$$

As has already been explained, when the system has attained equilibrium, then:

$$f = f_r = (\beta p f_m / \alpha 10^n)$$

where:

$$f_m = (\alpha 10^n / \beta p) f$$

but:

$$f = f_1 + f_2 = k_1 q + k_2 q = q (k_1 + k_2)$$

where:
q is flow rate in liters per second,

| $k_1$ | are hydraulic coefficients in revolutions per |
| --- | --- |
| $k_2$ | litre of each of the rotors of the turbine BR |

Therefore:

$$f_m = (\alpha 10^n / \beta p) (k_1 + k_2) q$$

If it is arranged that:

$$p = (k_1^\circ + k_2^\circ) 10^n$$

where:

| $k_1^0$ | are theoretically hydraulic coefficients of |
| --- | --- |
| $k_2^0$ | the two turbine rotors | n is equal to 0, 1 or 2 according to the requirements of each case, $p \, \alpha = 2$ $$\beta = \frac{k_1 + k_2}{k_1^0 + k_2^0} = 1 \pm e \, (e < 1)$$

the following equation is obtained:

$$f_m = 2 \, q$$

A chain of complementary gears will allow the operation of an indicator unit to provide direct reading according to current standards.

The auxiliary circuits such as the frequency-to-analog converter 18 and the tachometric generator 24 are provided for improving the dynamic functioning of the control.

An indicator 28, which completes the auxiliary control units, is connected to an alarm device to warn the operator of a functional fault if the correct limits are exceeded.

As far as the secondary control assembly is concerned, the arrangement of the constituent elements is different and, in accordance with an aspect of the invention, controls an electronic single phase oscillator 34 which produces a frequency signal $f'_m$.

As indicated in FIG. 3, the output signals from the matching circuits 13 and 14 are also applied to dividers 29 and 30 identical to the dividers 15 and 16 respectively.

In contrast to the preceding loop, the signal $f_2'$ from the compensation rotor 12 of the turbine BR is here applied to the count-up input (+) of a reversible counter 31 which, as before, is connected via a digital-to-analog converter 32 and an amplifier 33 to control the oscillator 34 which comprises a phase shifting network 34a and a feedback loop formed by an amplifier 34b.

The frequency $f_m'$ thus produced is applied to a programmer constructed, as in FIG. 2, of a multiplier 36 effecting multiplication by $k_1/\gamma$, followed by an anticoincidentally connected subtractor 37 to which is connected the $f_1'$ signal from the divider 30. The signal produced at the output of the subtractor 37 is connected to a multiplier 37 effecting multiplication by $k_2/k_1$ which produces at its output the control signal $f_r'$ given by:

$$f' = (f_m' \frac{k_1}{\delta} - f_1) \frac{k_2}{k_1}$$

where $k_1$ and $k_2$ are as above, $\gamma$ being an integer selected so that $0 < k_1/\gamma < 1$.

Thus $f_m'$ is expressed by:

$$f_m = (f_2 \frac{k_1}{k_2} + f_1) \frac{\delta}{k_1}$$

but:

$$f_1' = f_1 \text{ and } f_2' = f_2$$

where finally:

$$f_m' = 2 \gamma q$$

The circuit thus constructed furnishes a means of detecting incidence of breakdown and malfunctioning of the counting circuit, and also of both the hydraulic part and the electronic part of the system which is a great advantage.

In fact, as disclosed in the above-mentioned U.S. specification, it has been arranged that a modification of the rotational speed of the primary rotor following an accidental braking, translates itself by a modification in a reverse direction of the speed of the secondary rotor.

Thus can be written:

$$f_m' = \delta \left( \frac{\Delta f_2}{k_2} + \frac{\Delta f_1}{k_1} \right)$$

$$= \gamma \Delta f_2 [(1/k_2) - (1/k_1)]$$

and as $k_2 << k_1$, so:

$$\Delta f_m' \simeq \gamma (\Delta f_2 / k_2)$$

To obtain this error factor, it is expedient and it suffices to apply the signals from the incremental coder 25 and from the control device to a reversible counter 39 or equivalent comparator, the incremental coder 25 being constructed to effect a multiplication of frequency $f_m$ by the integer $\gamma$.

The counter 39 permanently assumes a state representing a function of the difference between the two applied frequencies and of the time during which the control is to be carried out.

Cyclically resetting the counter 39 to zero, can constitute a means of avoiding a too rapid evolution of the indicated differential integral.

To complete the device and render its function automatic, two numerical control circuits 40, 41 ensure that the state of the counter 39 does not exceed certain predetermined limits and they actuate an alarm if such limits are exceeded.

Under the same conditions, the element 37 can take the form of a reversible counter and make $f_m'$ appear to be zero, and $\Delta f_m'$ appear to be given by:

$$\Delta f_m' = \gamma \delta \Delta f \left( \frac{1}{k_2} + \frac{1}{k_1} \right)$$

the differential functioning appearing directly under these conditions without involving the intervention of auxiliary circuits as in the preceding arrangement.

This alternative arrangement is nevertheless less interesting than the previous one because of the fact that it does not effect control of the totality of the electronic part of the system.

Another interesting application of the invention is the provision of a measurement signal which is a representation of the difference between the two available quantities in frequency form as is frequently the case in measurement of flow, in tachometry, etc.

In the case of measurement by two differentially mounted flow-metering turbines connected to arrangements as illustrated in FIG. 2, the signal $f_1 = q_1 C_1$ will be applied to the count-up input (+) of the reversible counter 1 and the frequency $f_2 = q_2 C_2$ on the input of the calculator 6c, then where:

$q_1, q_2$ = the outputs passing through each of the turbines, $C_1, C_2$ = actual electrical coefficients in pulses per liter of each of the turbines, $p = C_2°$ = the theoretical value of the coefficient of the second turbine, $b = C_2°/C_1°$ and $a = C_2°/C_1$ there is obtained $$f_m = f_1/C_1 + f_2/C_2 = q_1 - q_2$$

In the case where the signal $f_2$ is to be applied to the subtract input of the calculator 6c, the resulting equation will become:

$$f_m = q_1 + q_2$$

which corresponds to the case of a signal adding unit.

In both cases, the controlled motor 4 actuates a totaliser for the indication of the differential integral or of the sum of the two flows, as well as a tachometric generator to provide an analog differential flow signal (other arrangements can be conceived without having to depart from the framework of the invention).

The framework of the invention will not be departed from by connecting a multiplicity of control outlets such as above-described controlling motors or electronic frequency generators as could be the case in industrial automation, for example, in the case of a mixer inserted in a circuit for the production of a liquid product consisting of definite proportions of pure constituents.

In this case, volumetric type pumps could be directly actuated through the intermediary of servo motors governed by a common signal, presenting a picture of the total throughput of the installation.

The advantage of the application of the invention to such an installation is the economy made on the elements which are otherwise necessary for the measuring devices and control apparatus.

Besides, it is emphasised that the variable speed control assembly according to the invention does not lose any significant information even when very rapid transient conditions are encountered. It can be used not only for the handling of fluids but also for the handling of strip material (foils, papers, plastic materials, etc.) and for the numerical control of machinery. A fluid-flow measurement device simplified even in relation to that described with reference to FIG. 3 and including at least one control assembly according to the invention would also come within the framework of the invention.

What is claimed is:

1. A control assembly for a cyclically operating electrically or hydraulically powered unit, which includes a control loop arrangement at least part of which is adapted to handle digital signals, said loop arrangement comprising a reversible counter including a plurality of successive stages and having a count-up series input, a count-down series input and parallel outputs at its successive stages; a sensor associated with said cyclically operating unit for the production of pulses at a multiple of the operating frequency thereof and including sensor output means for deriving a signal from the sensor and applying it to one input of said counter; means for applying a control frequency signal to the other of the inputs of the counter whereby the counter output provides a digital indication of any difference between the control frequency and the sensor output signal; a digital-to-analog converter having a number of successive inputs parallel connected to the respective stage outputs of the reversible counter and a single output providing an analog signal corresponding to the counter digital output; and means connecting the converter output to said cyclically operating unit to control the same.

2. A control assembly according to claim 1, wherein said sensor output means is connected in series with a computer which receives the signal train fed from the sensor output, said computer being controlled by parallel external signals so as to carry out an arithmetic transformation operation on the signal derived from the sensor and apply the thus transformed signal to the corresponding input of the reversible counter.

3. A control assembly according to claim 2, wherein the means connecting the converter output to the cyclically operating unit comprises a stage having several inputs and one output, the converter output being connected to one of said several stage intputs; and a known per se source of complementary signals under control of said control signal and having its output connected to another said stage input for improving unit control.

4. A control assembly as in claim 1, wherein said cyclically operating unit is an electric motor, and said sensor comprises a coder mounted on the shaft of the motor for the production of pulses at a multiple of the frequency thereof.

5. A control assembly as in claim 1, wherein said cyclically operating unit comprises an electronic generator producing oscillation signals, and said sensor comprises a transmission circuit arranged and connected to said generator for the production of pulses at a multiple of the frequency thereof.

6. A composite control assembly comprising first and second control assemblies according to claim 1, the cyclically operating unit of said first control assembly being a motor and the sensor being a coder mounted on the shaft thereof, the first control assembly being adapted to relate the speed of the motor to the rate of flow of a fluid, the control assembly being connected to the second control assembly of which the cyclically operating unit is an electronic oscillator and the sensor is a transmission path, the second con-rol assembly serving to control the measurement.

* * * * *